United States Patent
Duval et al.

(10) Patent No.: US 10,298,544 B2
(45) Date of Patent: May 21, 2019

(54) METHOD AND SYSTEM FOR ESTABLISHING VIRTUAL PRIVATE NETWORKS BETWEEN LOCAL AREA NETWORKS

(71) Applicant: CITYPASSENGER, Les Ulis (FR)

(72) Inventors: Bruno Duval, Courtaboeuf (FR); Emmanuel Trublereau, Courtaboeuf (FR); Sven Falempin, Courtaboeuf (FR)

(73) Assignee: CITYPASSENGER, Les Ulis (FR)

( * ) Notice: Subject to any disclaimer, the term of this patent is extended or adjusted under 35 U.S.C. 154(b) by 242 days.

(21) Appl. No.: 15/021,185

(22) PCT Filed: Sep. 11, 2014

(86) PCT No.: PCT/EP2014/069454
§ 371 (c)(1),
(2) Date: Jun. 27, 2016

(87) PCT Pub. No.: WO2015/036513
PCT Pub. Date: Mar. 19, 2015

(65) Prior Publication Data
US 2016/0294777 A1    Oct. 6, 2016

(30) Foreign Application Priority Data
Sep. 11, 2013   (FR) ...................... 13 58745

(51) Int. Cl.
*H04L 29/06* (2006.01)
*H04L 12/46* (2006.01)
(Continued)

(52) U.S. Cl.
CPC ........ *H04L 63/0272* (2013.01); *H04L 9/3263* (2013.01); *H04L 12/4604* (2013.01);
(Continued)

(58) Field of Classification Search
CPC ... H04L 45/00; H04L 63/0209; H04L 63/029; H04L 63/0272; H04L 12/4604;
(Continued)

(56) References Cited

U.S. PATENT DOCUMENTS

| 9,749,291 B2 * | 8/2017 | Fork ................... H04L 61/2592 |
| 2007/0104119 A1 * | 5/2007 | Sarkar ................. H04L 12/4641 370/254 |

(Continued)

FOREIGN PATENT DOCUMENTS

| CA | 2680599 | 12/2009 |
| EP | 2590369 | 5/2013 |

OTHER PUBLICATIONS

International Search Report and Written Opinion with English Language Translation, dated Nov. 26, 2014, Application No. PCT/EP2014/069454.

(Continued)

*Primary Examiner* — Amir Mehrmanesh
(74) *Attorney, Agent, or Firm* — Womble Bond Dickinson (US) LLP

(57) ABSTRACT

The invention relates to a method for establishing a virtual private network between local area networks, each local area network comprising at least one access gateway to a public network and a unit comprising a VPN client, the method comprising the following steps carried out each time a unit is powered on: sending, by the unit, of at least one connection message to an infrastructure connected to the public network and comprising at least one intermediate server, each connection message passing through a respective gateway of the local area network; reception, by the infrastructure, of each connection message; and determination of topology data identifying each bridge of the local area network in which the unit is placed, the method further comprising the following steps carried out for a plurality of (Continued)

US 10,298,544 B2

Page 2 units: instancing, by a predetermined intermediate server of the infrastructure, of a VPN server associated with the plurality of units; establishing an encryption tunnel between the VPN server and the VPN client of each unit from the corresponding topology data; and creating and storing routing data representative of a data routing rule between the established encryption tunnels.

12 Claims, 4 Drawing Sheets

(51) Int. Cl.
| | |
|---|---|
| *H04L 12/723* | (2013.01) |
| *H04L 9/32* | (2006.01) |
| *H04L 12/66* | (2006.01) |
| *H04L 12/741* | (2013.01) |
| *H04L 29/12* | (2006.01) |
| *H04L 12/701* | (2013.01) |

(52) U.S. Cl.
CPC .......... *H04L 12/4641* (2013.01); *H04L 12/66* (2013.01); *H04L 45/00* (2013.01); *H04L 45/50* (2013.01); *H04L 45/74* (2013.01); *H04L 61/2007* (2013.01); *H04L 63/0209* (2013.01); *H04L 63/029* (2013.01); *H04L 2212/00* (2013.01)

(58) Field of Classification Search
CPC . H04L 12/66; H04L 12/4641; H04L 61/2007; H04L 45/74; H04L 45/50; H04L 9/3263; H04L 2212/00; H04L 12/5689
See application file for complete search history.

(56) References Cited

U.S. PATENT DOCUMENTS

| | | | |
|---|---|---|---|
| 2010/0177752 A1* | 7/2010 | Aggarwal | ............... H04L 45/50 |
| | | | 370/338 |
| 2013/0018765 A1 | 1/2013 | Fork et al. | |
| 2016/0119156 A1* | 4/2016 | Drake | ..................... H04L 45/16 |
| | | | 709/223 |
| 2017/0195483 A1* | 7/2017 | Gault | ................ H04M 3/42289 |

OTHER PUBLICATIONS

French Search Report, dated Apr. 30, 2014, French Application No. 1358745.
Hori, Kenji, et al., "Auto-Configuration Method of Provisioning System for Internet VPNs", *IEICE Transactions on Communications*, vol. E89B, No. 9, (Sep. 9, 2006), 2424-2433.

* cited by examiner

METHOD AND SYSTEM FOR ESTABLISHING VIRTUAL PRIVATE NETWORKS BETWEEN LOCAL AREA NETWORKS

GENERAL FIELD

The invention relates to the field of virtual private networks between different local area networks.

PRIOR ART

Solutions for creating private computer networks between several remote sites, that is, computer networks in which confidentiality of data is assured are known from the prior art.

A known solution for putting in place a private network is the MPLS protocol (Multi Protocol Label Switching), a protocol based on label switching.

But installing an MPLS network is complex and costly as it needs a dedicated physical network to be set up to interconnect local area networks.

An alternative solution to MPLS consists of establishing a virtual private network (VPN).

A VPN network interconnects two local area networks via a public transmission network (typically the Internet). Data sent between two machines of these two local area networks are encapsulated encrypted according to a protocol known as "tunnelling".

In this way, a VPN network has remote machines communicating with the same level of data security as that to be found in a conventional local area network.

FIG. 1 shows an example of a virtual private network between two remote local area networks Ra and Rb. Each local area network Ra, Rb comprises at least one terminal Ua, Ub and one access gateway Pa, Pb to the same public network I.

Each gateway Pa, Pb typically comprises a plurality of ports and a firewall which controls the opening of ports by which data coming from the public network are authorised to enter the corresponding local area network. Each gateway is for example a multifunction ADSL box commonly called "ADSL box".

Each local area network Ra, Rb also comprises a VPN module for encrypting/decrypting packets according to the above principle of tunnelling.

The two VPN modules function according to the client/server model. One of the two VPN modules is a VPN client sending an authentication request to the other module which is a VPN server. If the client is correctly identified by the VPN server the latter creates an encryption tunnel with the VPN client (the tunnel is shown in FIG. 1 by an arrow in dotted lines).

However, in such a system, establishing a virtual network requires prior configuration of the local area networks intended to communicate with each other.

First, the VPN server must previously be configured to recognise a list of VPN clients. Also, identification requests often require the opening of particular incoming ports of the server-side firewall (typically port 1194). The gateway must therefore also be configured.

Secondly, establishing the VPN link also needs client-side configuration.

PRESENTATION OF THE INVENTION

An aim of the invention is to propose a virtual private network system between remote sites the set-up for which needs no configuration from each site.

For this purpose, according to a first aspect, a method for establishing a virtual private network between local area networks is proposed, each local area network comprising at least one access gateway to a public network and one unit comprising a VPN client, the method comprising the following steps carried out each time a unit is powered on;
 sending by the unit of at least one connection message to an infrastructure connected to the public network and comprising at least one intermediate server, each connection message transiting via a respective gateway of the local area network,
 reception by the infrastructure of each connection message and determination of topology data identifying each gateway of the local area network in which the unit is placed,
the method further comprising the following steps carried out for a plurality of units:
 instancing, by a predetermined intermediate server of the infrastructure, of a VPN server associated with the plurality of units,
 establishing an encryption tunnel between the VPN server and the VPN client of each unit from the corresponding topology data,
 creation and storing of routing data representative of a data routing rule between the established encryption tunnels.

According to a second aspect, an interconnection infrastructure for establishing a virtual private network between several local area networks is proposed, each comprising at least one access gateway to a public network, the infrastructure comprising:
 at least one intermediate server, the or each intermediate server comprising instancing means of at least one VPN server adapted to establish at least one encryption tunnel with at least one VPN client located in a remote local area network,
 a controller adapted to transmit an instancing request of a VPN server to the intermediate server at least provided on reception of topology data identifying at least one access gateway to a public network in a remote local area network,
 a router connected to the public network, to the intermediate server at least provided and to the controller, and comprising data routing means between each VPN server instanced by the intermediate server at least provided and VPN clients located in remote local area networks.

According to a third aspect, an interconnection unit intended to be connected in a local area network is proposed, comprising at least one access gateway to a public network for establishing a virtual private network with at least one other remote local area network also having access to the public network, the unit comprising:
 a data-processing module adapted to generate connection messages,
 a network communication module adapted to communicate the connection messages to an interconnection infrastructure according to the second aspect, by means of each access gateway of the local area network, and
 a VPN client for establishing at least one encryption tunnel with a remote VPN server.

According to a fourth aspect, an interconnection system for establishing a virtual private network between at least two local area networks is also proposed, the system comprising an infrastructure according to the second aspect and at least two units according to the third aspect, wherein each unit comprises a storage module of a group identifier of interconnectable units, each intermediate server of the infrastructure being associated with a specific group identifier.

A first advantage of the invention is that it proposes an automatic solution for establishing a virtual private network between remote sites while ensuring confidentiality of data exchanged between the interconnected local area networks.

A second advantage of the invention is its independence in regards to the access gateways present in the local area networks. The replacement or reconfiguration of an access gateway is undertaken transparently, without need of additional reconfiguration of the corresponding unit.

A third advantage of the invention is the automatic administration of multiple access to the public network which ensures high availability.

The invention is advantageously completed by the following characteristics, taken singly or any of their technically possible combinations:
the topology data comprise at least one public IP address, each public IP address identifying a gateway of the corresponding local area network from the public network;
the sending step is carried out periodically;
the sending and reception steps of connection messages are carried out according to the HTTPS protocol on presentation of a certificate stored in each unit.
the step for establishing an encryption tunnel comprises the sub-steps of creating several encryption sub-tunnels, each sub-tunnel corresponding to a route passing through a specific access gateway of a local area network, and aggregation of sub-tunnels in an encryption tunnel.
the intermediate server performing the instancing of the VPN server is determined by a group identifier of interconnectable units contained in the connection messages.

BRIEF DESCRIPTION OF THE FIGURES

Other characteristics, aims and advantages of the invention will emerge from the following description which is purely illustrative and non-restrictive and which must be considered with respect to the attached diagrams, in which.

In all figures similar elements bear identical reference numerals.

DETAILED DESCRIPTION OF THE INVENTION

Figure 1:
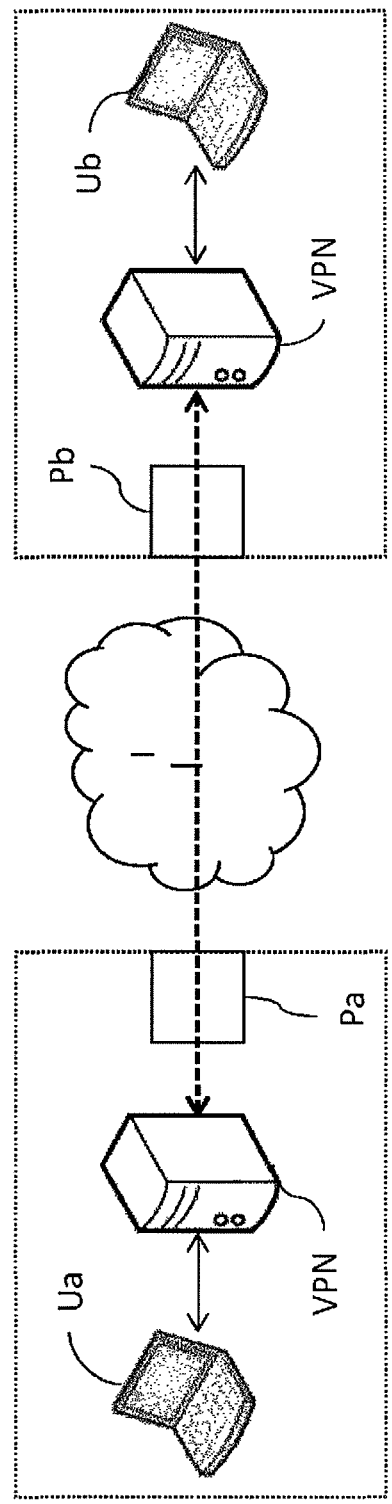
FIG. 1, already discussed, schematically illustrates a system for establishing a virtual private network.
Figure 2:
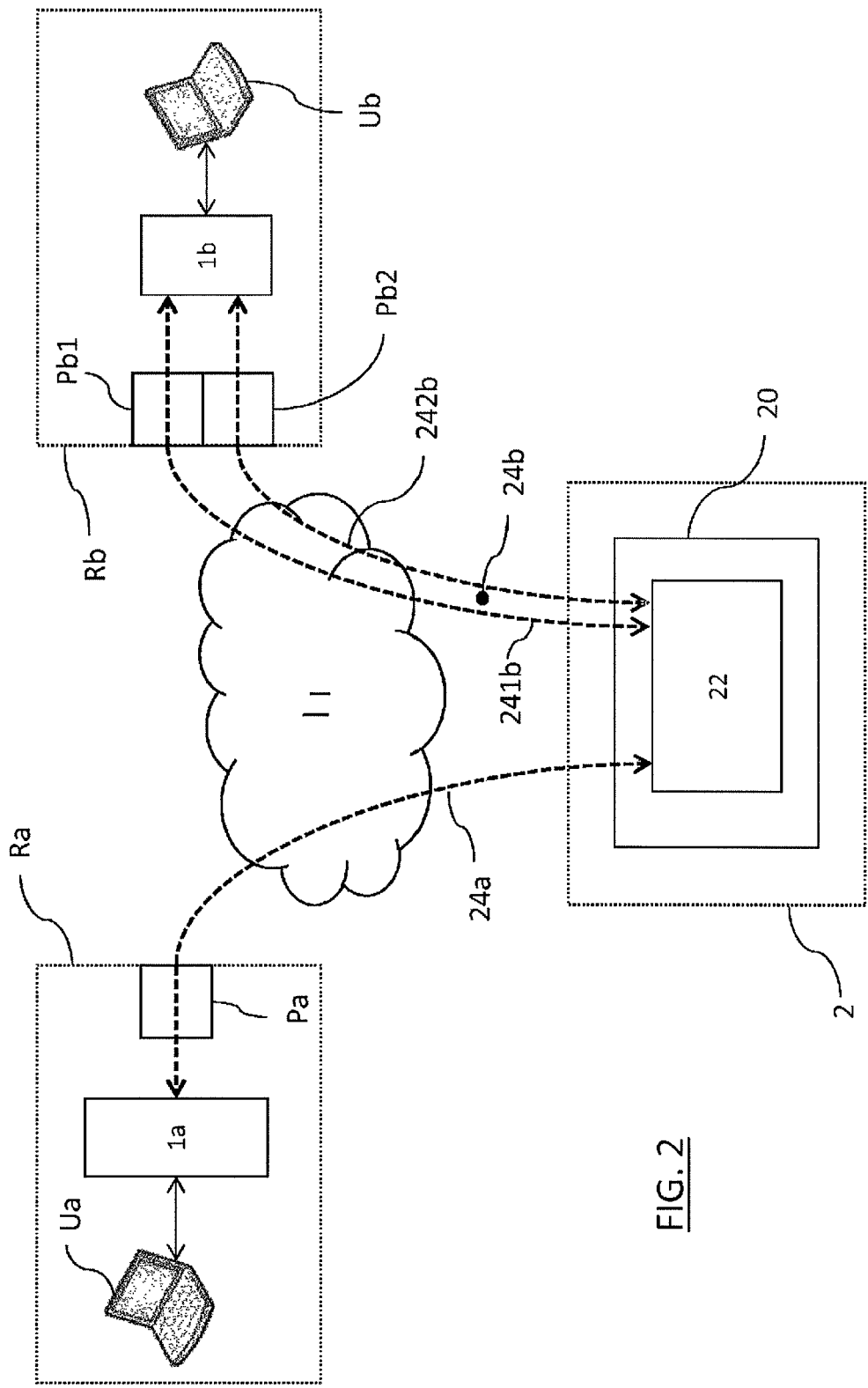
FIG. 2 schematically illustrates an interconnection system between several local area networks according to an embodiment of the invention.
Figure 3:
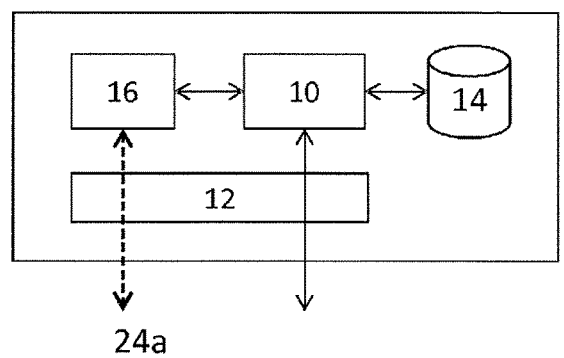
FIG. 3 schematically illustrates a unit according to an embodiment of the invention.
Figure 4:
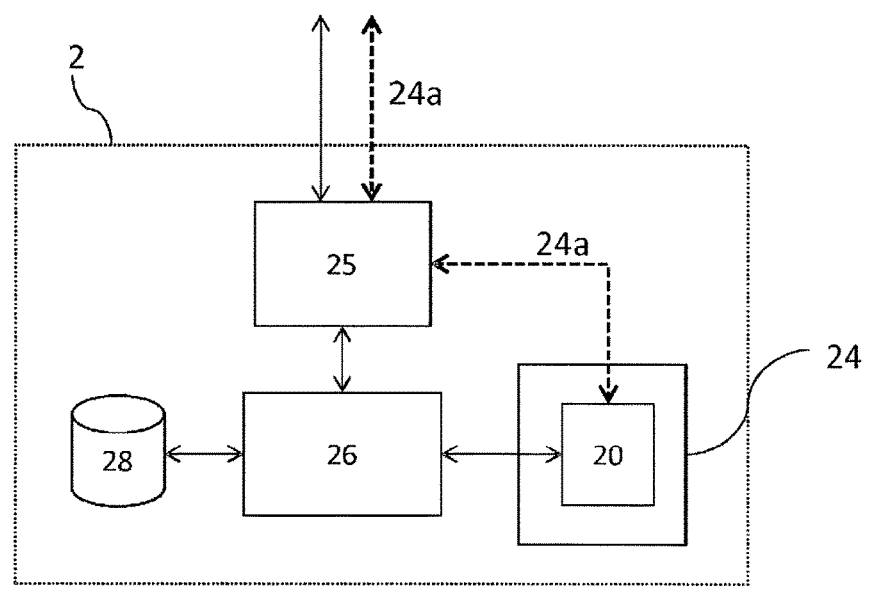
FIG. 4 schematically illustrates an interconnection infrastructure according to an embodiment of the invention.

In reference to FIGS. 2 to 4, a first remote local area network Ra and a second remote local area network Rb are to be interconnected via a connection of virtual private network type.

Each local area network comprises at least one access gateway Pa, Pb to the Internet and at least one terminal Ua, Ub connected to at least one access gateway.

Each access gateway Pa, Pb1, Pb2 has a local IP address visible from each terminal present in the corresponding local area network and a public IP address visible from the Internet network.

In the example illustrated in FIG. 2 the first local area network Ra comprises a first access gateway Pa to a public network and a second local area network comprises a pair of second access gateways Pb1, Pb2 to the public network.

An interconnection unit 1a, 1b is placed in each local area network.

Each unit 1a, 1b comprises network communication means 12 adapted to communicate with at least one of the access gateways of the local area network in which the unit is placed.

Each unit 1a, 1b also comprises storage means 14, such as flash or EEPROM memory, and a data-processing module 10, for example a processor. Each unit is further configured to execute at least one VPN client 16.

An interconnection infrastructure 2 separate from the local area networks Ra, Rb, is also connected to the Internet.

The infrastructure 2 forms a local area network comprising at least one intermediate server 20. Each intermediate server 20 comprises instancing means of at least one VPN server configured to establish an encryption tunnel with a plurality of remote VPN clients.

In an embodiment illustrated in FIG. 4, the infrastructure 2 comprises a router 25, a controller 26 and a virtualizer 24 and a database 28.

Router

The router 25 ensures an access gateway function to the Internet for the infrastructure 2. The router 25 has a single public IP address visible from the Internet.

The router 25 ensures the routing of data received from the Internet to each intermediate server 20 having a specific IP address in the local area network of the infrastructure 2, for example by address translation (NAT) and/or source routing. The router 25 also ensures routing of requests emanating from units to the controller 26.

The router 25 also comprises a firewall which controls the opening of access ports to the infrastructure 2.

Virtualizer

The virtualizer 24 comprises a virtual machine (or hypervisor) adapted to execute at least one operating system. Each intermediate server 20 is an operating system executed by the virtualizer 24, each operating system being isolated from the other operating systems.

The virtualizer 24 is configured to instance dynamically the intermediate servers, monitor their state of operation and/or cancel them.

Each instanced intermediate server 20 (also called "central") is identified by a single private IP address in the infrastructure 2. Each server comprises a plurality of logic ports by which data emanating from the router 25 can be received. By way of example, FIG. 4 shows an encryption tunnel 24a established with the unit 1a according to a method which will be described below in the present document.

For example, the virtualizer 24 can comprise a FreeBSD® host operating system, and the virtual machine can be of type KVM® or QEMU®. As a variant the virtual machine is a set of BSD Jails® for compartmenting the intermediate servers from each other in the FreeBSD® operating system. Other types of isolation are valid. It is possible for example to use light virtualisation of type Jail or openVZ.

Each intermediate server 20 can be a slave operating system of type NanoBSD®, and each instanced VPN server can be a daemon OpenVPN® running in the background of the corresponding slave NanoBSD® operating system.

Controller

The controller 26 is connected to the router 25, and to the intermediate servers and to the database 28. The controller 26 has an IP address in the network of the infrastructure 2.

If the infrastructure 2 has a second-level domain name, for example "mydomainname.com", the controller 26 can also have a sub-domain name, for example "controller.mydomainname.com".

The controller 26 is also configured to monitor the operation of the intermediate servers and detect a faulty intermediate server 20.

The controller 26 communicates also with each interconnection unit powered on by means of the router 25. The communications between each unit 1a, 1b and the controller 26 are preferably ensured by the HTTPS protocol on presentation of a certificate previously stored in each unit.

The controller 26 is also configured to generate event messages and register these messages in a log in the database 28.

Establishing a Virtual Private Network

Figure 5:
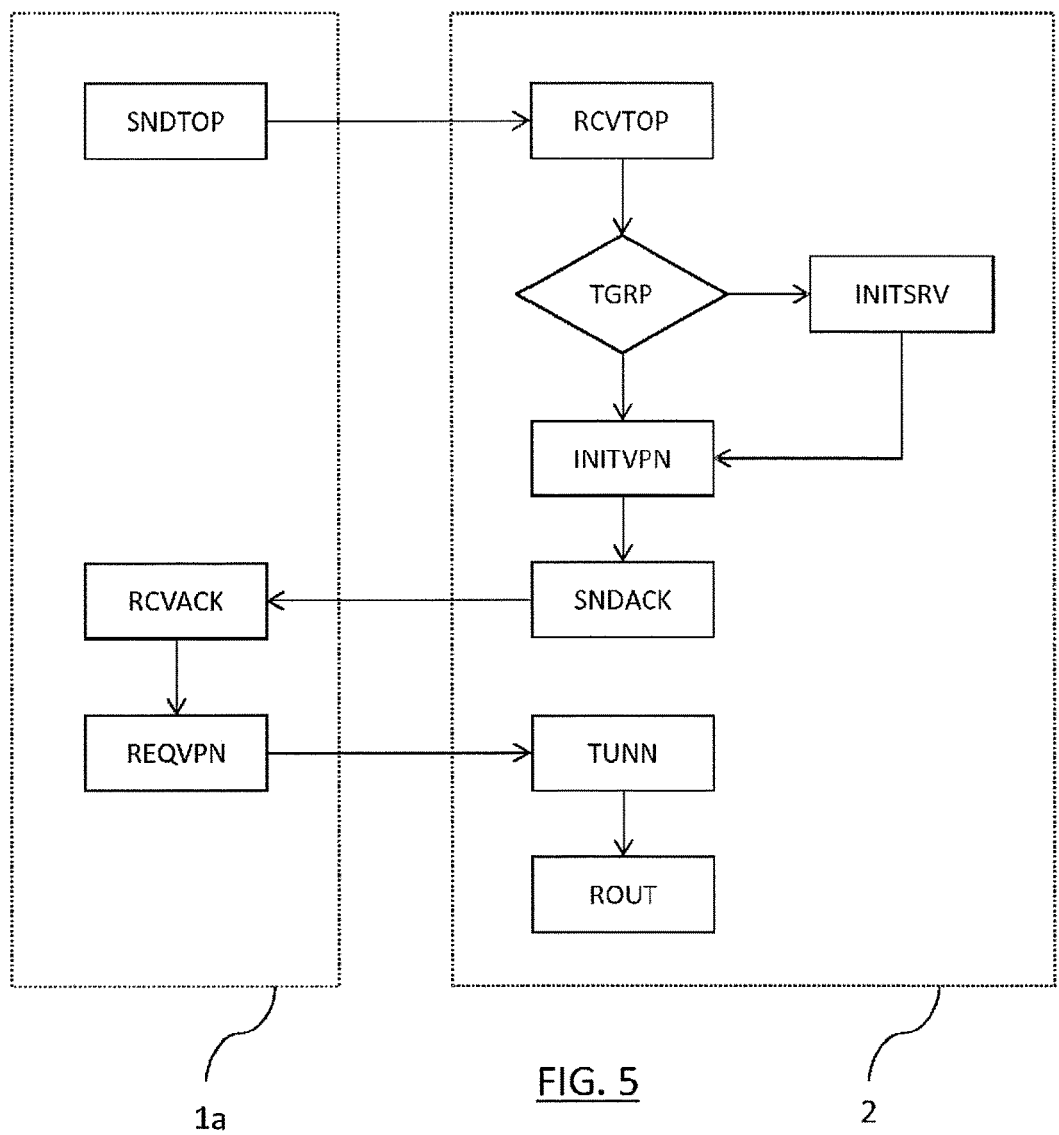
FIG. 5 is an organigram of steps of a method for establishing a virtual private network according to an embodiment of the invention.

In reference to FIG. 5, the establishment of a virtual private network comprises the following steps carried out for a first unit (for example, unit 1a of the first local area network).

In a SNDTOP step, the unit 1a sends to the controller 26 of the infrastructure 2 at least one connection message, each connection message transiting via a respective gateway of the network in which the unit 1a is placed (here, the local area network Ra comprises just a single gateway Pa, so a single message is sent to the unit 1a).

This message is sent via each gateway and possibly on a list of different ports to discover an open port. This mechanism can discover and use a port other than the port by default (port 1194).

The address of the destination controller 26 is determined and known from each unit 1a, 1b. This address can be stored in the storage means 14 prior to initial powering up of a unit in a local area network. The address can be the IP address of the controller 26, or preferably the domain name of the controller 26, which makes any change of IP address of the controller 26 transparent.

In a reception step RCVTOP, the controller 26 receives the at least one connection message, and determines as a consequence the topology of the network Ra in which the unit 1a is placed. The topology identifies especially which are the access gateways to the Internet of the local area network Ra in which the unit 1a is placed. The topology comprises especially, for each gateway via which a respective connection message (here gateway Pa) transited, a public IP address and a private IP address in the local area network Ra.

The same steps are carried out for the interconnection unit 1b powered on in the local area network Rb.

The topology of each local area network is therefore determined without making incoming connections in each local area network from the public network I.

In a step INITVPN, the intermediate server 20 instances a VPN server 22. This step INITVPN can be carried out after determination of topology data of a first network (for example Ra), or else after determination of topology data of several networks (Ra and Rb).

More precisely, the controller 26 determines an intermediate server 20 to be used and sends it an instancing request.

The intermediate server 20 selected by the controller 26 starts up an instance of a VPN server 22, and returns a startup notification to the controller 26. The controller 26 can then send a notification to the unit having sent the control message in a step SNDACK to signify to the unit that a VPN server 22 is ready to be used.

The unit receives the startup notification in a step RCVACK.

In a step TUNN, an encryption tunnel 24a is then established between the instanced VPN server 22 and the unit 1a. This step is carried out conventionally. The encryption tunnel 24a can conventionally be established by the following steps: request sent by the VPN client 16 of the unit 1a to the instanced VPN server 22, creation of the tunnel 24a by the VPN server 22 and return by the VPN server 22 of notification to the VPN client 16. On completion of this step TUNN the unit 1a has a virtual IP address attributed to it by the server 22.

The step TUNN is also carried out for establishing an encryption tunnel 24b between the VPN server 22 and the unit 1b.

In a step ROUT, routing data representative of a routing rule between the first encryption tunnel 24a, 24b and the second encryption tunnel 24a, 24b are then created then stored in the database 28.

A virtual private network is then established between the local area networks Ra and Rb.

The creation/storing step ROUT is carried out for each new unit registered with the infrastructure 2, after it is powered on in a respective local area network. If N units have already been powered on, and N respective encryption tunnels have been created, the step ROUT creates and stores new routing rules between the last encryption tunnel created and the encryption tunnels created previously.

A program comprising code instructions for execution of the steps described hereinabove carried out by the unit is stored in the storage means 16, when this program product is executed by the data-processing module.

The program can be typically a script executed when each unit is powered on.

The sending step SNDTOP of connection messages is preferably repeated over time, for example periodically, after each unit is powered on. This lets the infrastructure detect changes in topology in each local area network, without this infrastructure making an incoming connection in the local area networks.

A change in topology can for example consist of a change in the number of gateways in operating mode in the local area network (powering on of a new gateway or switching off of an existing gateway) or the change in a parameter associated with a gateway (for example, change in the public IP address of a gateway).

Routing of Data Between Interconnected Units

A packet of useful data sent by a first terminal Ua of the first local area network Ra to a second terminal Ub of the second network Rb is first encrypted by the first VPN client 16 of the first unit, then sent to the VPN server 22 via the corresponding tunnel 24a. The packet is decrypted by the first VPN server 22, and sent to the second. The packet is then encrypted again by the VPN server 22, and sent via the tunnel 24b after examination of the routing rule established during the step ROUT to the second VPN client 16 of the unit 1b, which decrypts the packet before sending it to the destination terminal Ub.

Details on Establishing an Encryption Tunnel

In an embodiment, the encryption tunnel is established by means of several digital certificates.

A digital certificate enters the scope of communication between two entities in a network. It "signs" the management data by a first entity to another entity. So, this other entity knows that the data it receives from the network comes from a reliable entity.

A first digital certificate is stored in the storage means 14 of each unit 1a, 1b, before its installation in the corresponding local area network Ra, Rb, during a pre-configuration step at the factory.

This first certificate is used to authenticate each unit 1a, 1b with the infrastructure. It secures transmission of management data described earlier (topology data, etc.) between the unit 1a, 1b and the intermediate server, prior to creation of the encryption tunnel, the latter being intended to transport useful data between two terminals of two remote local area networks Ra, Rb.

On reception of an inscription message signed by an interconnection unit, such as 1a, by means of its first certificate, the controller verifies if the unit 1a is known to the system.

If this is the case, the controller controls generation of a second certificate (second level of security), different to the first.

The controller then sends this generated second certificate to the unit 1a.

The encryption tunnel 24a as such is created by request of the unit 1a, by means of the second digital certificate it has received from the controller, conventionally.

The same steps are carried out to create the encryption tunnel 24b between the intermediate server and the unit 1b.

The first certificate is specific to each unit 1a, 1b so as to distinguish the different units in the system.

If two machines (units) using the same first digital certificate are detected by the controller, this first certificate as a duplicate can be revoked.

However, it can be provided that the second generated digital certificate is the same for all tunnels 24a, 24b created to interconnect the units 1a, 1b belonging to a same group.

The second digital certificate can be generated by the controller itself.

However, in more decentralised architecture, the second digital certificate is generated by a third-party entity (PKI) external to the infrastructure 2 (that is, an entity accessible by the infrastructure passing through the public network I).

Entrusting the generation of this second digital certificate to an external entity improves the security of the VPN, as this second certificate is never stored in the infrastructure 2 (the latter simply acting as relay between the third-party entity and the unit 1a).

In this case, the controller is authenticated with this third-party entity by means of a third certificate ("root" certificate), previously stored by the controller.

This third certificate in this case secures communications between the controller and the third-party entity, and consequently contributes yet another level of security to the system.

A third certificate can be provided by instanced intermediate server. In this case, before it is brought into service, a predetermined list of "root" certificates is stored in the controller. Each time a new intermediate server is instanced, a new "root" certificate is associated with it by the controller.

Providing a plurality of "root" certificates isolates the different groups of interconnectable units on the security level.

Aggregation of Encryption Tunnels

Figure 6:
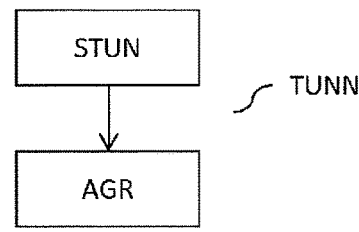
FIG. 6 illustrates the sub-steps of a step also shown in FIG. 5.

In reference to FIG. 6, the step TUNN for establishing an encryption tunnel with a local area network comprising several access gateways can include the sub-steps of creation STUN of several encryption sub-tunnels, each sub-tunnel corresponding to a route passing through a specific access gateway of a local area network, and aggregation AGR of sub-tunnels in an encryption tunnel.

Each sub-tunnel route can be associated with a particular port of the router 25 of the infrastructure 2.

In an embodiment implementing packet switching, the different sub-tunnels are asked to send different packets in parallel. This technique increases the maximal bandwidth of a local area network.

The second local area network shown in FIG. 2 comprises two access gateways Pb1, Pb2 to the Internet connected to the second interconnection unit 1b. The topology determined by the box therefore contains the respective public IP addresses of these two gateways. Two encryption sub-tunnels 241a, 242b are established during the step TUNN which is followed by the aggregation step AGR to create a common tunnel 24b between the local area network Rb and the VPN server 22.

Interconnection of Units Belonging to a Same Group

In an embodiment, each interconnection unit forms part of boxes to be interconnected. For example, a group of units can correspond to a set of sites of the same enterprise, each unit being placed in the local area network of a respective site of the enterprise.

A predetermined group identifier is then stored in the storage means of each unit. Also, each intermediate server 20 is attributed a specific group identifier. A correspondence table associating group identifiers and intermediate servers is stored in database 28.

The data-processing unit 10 of each unit then reads the group identifier stored by the unit and inserts it into each connection message sent during the step SNDTOP. Also, in a step TGRP the controller determines an intermediate server 20 to be used as a function of the group identifier received. To do this, the controller searches in the association table for an instance of intermediate server 20 associated with this same group identifier.

If no intermediate server 20 is found in the correspondence table, the controller 26 sends an instancing request of a new intermediate server 20 to the virtualizer 24, in a step INITSRV the virtualizer 24 instances a new intermediate server 20, and a notification is returned to the controller 26.

If instancing occurs successfully, a new entry associating the created server instance with the group identifier received from the box is saved in the database 28.

The controller 26 then sends to the intermediate server 20 the topology received from the box.

On startup of the virtualizer 24, no intermediate server 20 is instanced; a new intermediate server 20 is instanced after each box belonging to a new group is powered on.

In an embodiment, each unit can also store a single site identifier. The site identifier can be predetermined, that is, stored in the storage means 14 of each unit before it is powered on in a local area network.

The site identifier is also inserted into the topology sent to the interconnection infrastructure 2 by the unit, in the step SNDTOP.

Such a site identifier lets the infrastructure 2 surely identify each unit 1a, 1b, even if the topology of a local area network Ra, Rb is modified (change of public IP address of an access gateway, for example).

Each topology received can be also saved in the database 28 of the infrastructure 2. For example, only the final topology value received from a box is saved.

In the database 28, the topologies can be stored in a hierarchy, for example in the JSON format (JavaScript Object Notation): a "group" object is associated with a group identifier and contains several "sites" objects. Each "site" object is associated with a site identifier and contains data representative of the topology of a corresponding local area network.

Authentication of Units by Certificate

A digital certificate is preferably stored in the storage means 16 of each unit, before it is brought into service.

Each certificate can first be used to authenticate a unit with the controller 26. All communications between a unit and the controller 26 can be ensured by the HTTPS protocol on presentation of the corresponding certificate, which is sent to the controller 26 during the step SNDTOP with or without the topology.

Each certificate can have a limited validity period, and the controller 26 can be configured to verify the date of validity during the reception step RCVTOP of the topology.

If the certificate is obsolete, the controller 26 can send a new certificate to the unit which sent it.

Each certificate can also be used to authenticate a unit with an intermediate server 20, within the scope of creation of an encryption tunnel 24a, 24b between the VPN client of this unit and a VPN server 22 instanced by the intermediate server 20.

Monitoring of Intermediate Servers by the Controller

The controller 26 can monitor proper operation of the virtualizer 24 and each instanced intermediate server 20. A monitoring step is therefore repeated over time by the controller 26, for example periodically. This monitoring step can include verification that a TCP activation port of each instanced intermediate server 20 is open.

If an intermediate server 20 fails to respond within a predetermined time, it is considered faulty; the controller 26 addresses the virtualizer 24 a request for restartup triggering restartup of the intermediate server 20 considered faulty.

To recreate the set of encryption tunnels interrupted on an intermediate server 20 which has been restarted, the step SNDTOP can be carried out repeatedly by each unit, for example periodically. The controller 26 can determine all topologies associated with the units belonging to the group managed by the intermediate server 20 which has been restarted.

Each intermediate server 20 can be executed in read-only mode in the virtualizer 24. In other terms, each intermediate server 20 does no writing of data in the virtualizer 24 itself, but all the same can access the database 28 in writing.

Administration of Virtual Private Networks Created

The infrastructure 2 can further comprise an administration interface (not illustrated). The administration interface can comprise an HTTP server and a web site accessible from a third-party terminal external to the infrastructure 2.

The administration interface is accessible by means of a classic pair of identifier and password.

The administration interface also modifies firewall rules configured in the router 25 by groups or by sub-groups.

Each unit can also comprise a user interface. The user interface can typically be displayed on a screen of the unit and/or on a third-party terminal by means of an HTTP server of the unit giving access to web pages stored in the storage means of the unit.

The user interface can comprise statutory information which inform of the current state of the unit, and especially:

the detected topology, for example presented in the form of a list of access gateways;

information relative to the tunnels created, aggregation information of sub-tunnels.

The user interface can also comprise buttons for executing the following actions on the unit: restartup of the unit, execution of the topology detection step DTOP, etc.

OTHER VARIANTS

The controller 26, the virtualizer 24 and the router 25 can be combined within a common physical server, or else can constitute separate physical servers in the infrastructure 2.

Each intermediate server 20 can be embedded in a virtualizer 24 or else can constitute a specific physical server in the infrastructure 2.

The database 28 can be stored in a separate data server or be stored in one of the elements of the infrastructure 2 such as the controller 26.

In the embodiment illustrated in FIG. 2, each unit is an independent physical box intended to be connected to a local area network.

As a variant, each unit is formed by a terminal of a local area network on which is installed a program comprising a VPN client, the program being configured to implement the steps carried out on the unit side such as described earlier. In this variant embodiment, the configuration of the unit consists of installing the program conducting the steps of the establishment method described in the storage means of the terminal used as unit.

The infrastructure 2 can be used to provide interconnected local area networks with additional services. In this way, each intermediate server 20 can host an SMS gateway, a DHCP server, a RADIUS server (Remote Authentication Dial-In User Service), etc.

The system described earlier offers multiple advantages, including the following:

high level of security of the overall architecture, delivery of boxes preconfigured at the factory "plug & play"/Industrialisation of deployments.

automatic recognition of the topology and automatic administration of multi-access xDSL Internet (high availability and load balancing, without any configuration necessary client-side), independence from the gateways in place (the box can be replaced transparently)

the public IP of each local area network can be variable automatic mounting of VPN redundancies between machines of a same group automatic mounting of a secure supervision and management network tightness and independence of connected groups of sites access to many services via the infrastructure: log server, URL filtering, SMS gateway, Radius server, storage server . . .

replacement of units in case of facilitated breakdown (the new unit downloads configuration of the old one during its installation)

flexibility and elasticity of architecture: the infrastructure can manage several groups of sites, each group being administered independently; but the infrastructure can be installed in a demilitarised zone (DMZ) of one of the interconnected local area networks.

The invention claimed is:

1. A method comprising:

establishing a virtual private network between a first local area network and a second local area network, wherein the first local area network includes a first access gateway to a public network and a first unit including a first VPN client, wherein the second local area network includes a second access gateway to the public network and a second unit including a second VPN client, the method further comprising:

whenever the first unit is powered on, the first unit sending a first connection message to an infrastructure connected to the public network, which infrastructure includes an intermediate server, wherein the first connection message transits via the first access gateway, whenever the second unit is powered on, sending by the second unit a second connection message to said infrastructure, wherein the second connection message transits via the second access gateway, receiving, by the infrastructure said first and second connection messages and determining topology data identifying the first and second access gateways, instantiating, by the intermediate server, a VPN server associated with the first and second units, establishing a first encryption tunnel between the VPN server and the first VPN client from the topology data, establishing a second encryption tunnel between the VPN server and the second VPN client from the topology data, creating and storing routing data representative of a data routing rule between the first encryption tunnel and the second encryption tunnel, to allow data sent by the first unit via the first encryption tunnel to be routed into the second encryption tunnel and then transmitted to the second unit, wherein said establishing each said first and second encryption tunnels comprises the sub-steps of:

creating several encryption sub-tunnels (241b, 242b), each sub-tunnel (241b, 242b) corresponding to a route passing through a specific access gateway (Pb1, Pb2) of a local area network (Rb), and aggregating the sub-tunnels (241b, 242b) into an encryption tunnel (24b).

2. The method according to claim 1, wherein said topology data comprise at least one public IP address, each public IP address identifying a gateway (Pa, Pb1, Pb2) of the corresponding local area network (Ra, Rb) from the public network (I).

3. The method according to claim 1, wherein the sending step (SNDTOP) is carried out periodically.

4. The method according to claim 1, comprising an authentication of the unit (1a, 1b) with the infrastructure (2) by a first digital certificate stored by the interconnection unit prior to its installation in a local area network.

5. The method according to claim 4, wherein the encryption tunnel between the unit (1a, 1b) and the infrastructure (2) is established by a second digital certificate different to the first digital certificate and generated following authentication of the interconnection unit with the infrastructure.

6. The method according to claim 5, wherein generation of the second digital certificate is executed by an entity external to the infrastructure (2).

7. The method according to claim 6, comprising an authenticating of the infrastructure (2) with the external entity (PKI) by a third digital certificate different to the first and second digital certificates.

8. The method according to claim 7, wherein the authenticating with the external entity is initiated by a controller of the infrastructure separate from the intermediate server.

9. The method according to claim 7, wherein a different third digital certificate is used for each intermediate server.

10. The method according to claim 1, wherein the intermediate server (20) performing the instancing of the VPN server (22) is determined (TGRP) by a group identifier of interconnectable units contained in the connection messages.

11. The method according to claim 1, wherein a controller of the infrastructure detects a malfunction of the intermediate server and controls the re-instancing of an intermediate server detected as having said malfunction.

12. A system comprising:

an interconnection infrastructure for establishing a virtual private network between a first local area network and a second local area network, wherein the first local area network includes a first access gateway to a public network and a first unit including a first VPN client, wherein the second local area network includes a second access gateway to the public network and a second unit including a second VPN client, the infrastructure comprising:

an intermediate server, configured to instantiate a VPN server associated with the first and second units, said VPN server configured to establish a first encryption tunnel between the VPN server and the first VPN client and a second encryption tunnel between the VPN server and the second VPN client, a controller adapted to transmit an instantiating request from the VPN server to the intermediate server after reception of topology data identifying the first and second access gateways, a router connected to the public network, to the intermediate server and to the controller, and comprising a data router configured to route data between the VPN server instantiated by the intermediate server and the first and second VPN clients to allow data sent by the first unit via the first encryption tunnel to be routed into the second encryption tunnel then transmitted to the second unit;

wherein when the first unit is powered on, the first unit sends a first connection message to the interconnection infrastructure, and the first connection message transits via the first access gateway, when the second unit is powered on, the second unit sends a second connection message to said interconnection infrastructure, and the second connection message transits via the second access gateway, the interconnection infrastructure receives said first and second connection messages and determines topology data identifying the first and second access gateways, the intermediate server instantiates the VPN server associated with the first and second units, the VPN server establishes the first encryption tunnel between the VPN server and the first VPN client from the topology data, and establishes the second encryption tunnel between the VPN server and the second VPN client from the topology data, the router creates and stores routing data representative of a data routing rule between the first encryption tunnel and the second encryption tunnel, to allow data sent by the first unit via the first encryption tunnel to be routed into the second encryption tunnel and then transmitted to the second unit, and said VPN server establishes each of said first and second encryption tunnels by:

creating several encryption sub-tunnels (241b, 242b), each sub-tunnel (241b, 242b) corresponding to a route passing through a specific access gateway (Pb1, Pb2) of a local area network (Rb), and aggregating the sub-tunnels (241*b*, 242*b*) into an encryption tunnel (24*b*).

\* \* \* \* \*